(12) United States Patent
McDonald

(10) Patent No.: US 6,256,727 B1
(45) Date of Patent: Jul. 3, 2001

(54) METHOD AND SYSTEM FOR FETCHING NONCONTIGUOUS INSTRUCTIONS IN A SINGLE CLOCK CYCLE

(75) Inventor: Robert Greg McDonald, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/076,593

(22) Filed: May 12, 1998

(51) Int. Cl.$^7$ .................................................. G06F 9/38
(52) U.S. Cl. ........................ 712/235; 712/205; 712/237
(58) Field of Search ................... 712/206, 7, 15, 712/218, 233, 237, 238, 239, 205, 235; 711/3

(56) References Cited

U.S. PATENT DOCUMENTS

| | | | |
|---|---|---|---|
| 4,313,158 | 1/1982 | Porter et al. | 711/140 |
| 4,719,570 | 1/1988 | Kawabe | 364/200 |
| 4,755,935 | 7/1988 | Davis | 364/200 |
| 5,163,140 * | 11/1992 | Stiles et al. | 711/140 |
| 5,442,760 | 8/1995 | Rustad et al. | 712/215 |
| 5,481,751 | 1/1996 | Alpert et al. | 712/213 |
| 5,495,590 | 2/1996 | Comfort et al. | 712/228 |
| 5,542,062 * | 7/1996 | Taylor et al. | 711/3 |
| 5,544,342 * | 8/1996 | Dean | 711/119 |
| 5,574,883 | 11/1996 | Freeman | 711/119 |
| 5,689,680 * | 11/1997 | Whittaker et al. | 711/127 |
| 5,889,986 | 3/1999 | Nguyen | 395/584 |
| 5,890,008 * | 3/1999 | Panwar et al. | 712/15 |
| 5,913,925 * | 6/1999 | Kahle et al. | 712/206 |
| 5,918,062 * | 6/1999 | Oberman et al. | 712/7 |
| 5,935,238 * | 8/1999 | Talcott et al. | 712/206 |

FOREIGN PATENT DOCUMENTS

| | | | |
|---|---|---|---|
| 2012682 | 8/1979 | (GB) | G06F/9/06 |
| 63-189943 | 8/1988 | (JP) . | |
| 773104 | 3/1995 | (JP) . | |

OTHER PUBLICATIONS

"The MIPS R10000 Superscalar Microprocessor." *IEEE Micro,* Kenneth C. Yeager, Apr. 1996, 28–40.
"Trace Cache: a Low Latency Approach to High Bandwidth Instruction Fetching." Eric Rotenberg et al., Apr. 11, 1996.

* cited by examiner

Primary Examiner—Thomas C. Lee
Assistant Examiner—Jungwon Chang
(74) Attorney, Agent, or Firm—Sawyer Law Group LLP; Anthony V. England

(57) ABSTRACT

A system and method for fetching noncontiguous blocks of instructions in a data processing system is disclosed. The system comprises an instruction cache means for providing a first plurality of instructions and branch logic means for receiving the first plurality of instructions and for providing branch history information about the first plurality of instructions. The system further includes an auxiliary cache means for receiving a second plurality of instructions based upon the branch history information. The auxiliary cache means overlays at least one of the second plurality of instructions if there is a branch in the first plurality of instructions and the branch is to the second plurality of instructions.

15 Claims, 7 Drawing Sheets

Sample Sequence of Fetched Instructions
602

| Cycle | Addr0 | Group0 | Addr1 | Group1 | Addr2 |
|---|---|---|---|---|---|
| 000 | 0x000 | L C B * | 0x010 | * * * * | 0x020 |
| 001 | 0x020 | * * * * | 0x030 | * * * * | 0x040 |
| 002 | 0x100 | L A S B | 0x110 | * * * * | 0x120 |
| 003 | 0x120 | * * * * | 0x130 | * * * * | 0x140 |
| 004 | 0x200 | L L A S | 0x210 | C B * * | 0x220 |
| 005 | 0x220 | * * * * | 0x230 | * * * * | 0x240 |
| 006 | 0x300 | L A S B | 0x310 | * * * * | 0x320 |
| 007 | 0x320 | * * * * | 0x330 | * * * * | 0x340 |
| 008 | 0x000 | L C B * | 0x100 | L A S B | 0x110 |
| 009 | 0x110 | * * * * | 0x120 | * * * * | 0x130 |
| 010 | 0x200 | L L A S | 0x210 | C B * * | 0x300 |
| 011 | 0x300 | L A S B | 0x000 | L C B * | 0x010 |
| 012 | 0x010 | * * * * | 0x020 | * * * * | 0x030 |
| 013 | 0x100 | L A S B | 0x200 | L L A S | 0x210 |
| 014 | 0x210 | C B * * | 0x220 | * * * * | 0x230 |
| 015 | 0x230 | * * * * | 0x240 | * * * * | 0x250 |
| 016 | 0x300 | L A S B | 0x000 | L C B * | 0x100 |
| 017 | 0x100 | L L A S | 0x200 | L L A S | 0x210 |
| 018 | 0x210 | C B * * | 0x300 | L A S B | 0x310 |
| 019 | 0x310 | * * * * | 0x320 | * * * * | 0x330 |
| 020 | 0x000 | L C B * | 0x100 | L A S B | 0x200 |
| 021 | 0x200 | L L A S | 0x210 | C B * * | 0x300 |
| 022 | 0x300 | L A S B | 0x000 | L C B * | 0x100 |
| 023 | 0x100 | L A S B | 0x200 | L L A S | 0x210 |
| 024 | 0x210 | C B * * | 0x300 | L A S B | 0x000 |

Program Segment
604

| Addr | Inst |
|---|---|
| 0x000 | Load |
| 0x004 | Compare |
| 0x008 | Br 0x100 |

606

| Addr | Inst |
|---|---|
| 0x100 | Load |
| 0x104 | Add |
| 0x108 | Store |
| 0x10c | Br 0x200 |

608

| Addr | Inst |
|---|---|
| 0x200 | Load |
| 0x204 | Load |
| 0x208 | Add |
| 0x20c | Store |
| 0x210 | Compare |
| 0x214 | Br 0x300 |

610

| Addr | Inst |
|---|---|
| 0x300 | Load |
| 0x304 | Add |
| 0x308 | Store |
| 0x30c | Br 0x000 |

METHOD AND SYSTEM FOR FETCHING NONCONTIGUOUS INSTRUCTIONS IN A SINGLE CLOCK CYCLE

FIELD OF THE INVENTION

The present invention relates generally to a superscalar processor and more particularly to a system and method for fetching noncontiguous instructions in such a processor.

BACKGROUND OF THE INVENTION

Processors having this organization employ aggressive techniques to exploit instruction-level parallelism. Wide dispatch and issue paths place an upper bound on peak instruction throughput. Large issue buffers are used to maintain a window of instructions necessary for detecting parallelism, and a large pool of physical registers provides destinations for all of the in-flight instructions issued from the window. To enable concurrent execution of instructions, the execution engine is composed of many parallel functional units. The fetch engine speculates past multiple branches in order to supply a continuous instruction stream to the window.

The trend in superscalar design is to scale these techniques: wider dispatch/issue, larger windows, more physical registers, more functional units, and deeper speculation. To maintain this trend, it is important to balance all parts of the processor-any bottlenecks diminish the benefit of aggressive techniques.

Instruction fetch performance depends on a number of factors. Instruction cache hit rate and branch prediction accuracy have been long recognized as important problems in fetch performance and are well-researched areas.

Because of branches and jumps, instructions to be fetched during any given cycle may not be in contiguous cache locations. Hence, there must be adequate paths and logic available to fetch and align noncontiguous basic blocks and pass them down the pipelines. That is, it is not enough for the instructions to be present in the cache, it must also be possible to access them in parallel.

Modem microprocessors routinely use Branch History Tables and Branch Target Address Caches to improve their ability to efficiently fetch past branch instructions. Branch History Tables and other prediction mechanisms allow a processor to fetch beyond a branch instruction before the outcome of the branch is known. Branch Target Address Caches allow a processor to speculatively fetch beyond a branch before the branch's target address has been computed. Both of these techniques use run-time history to speculatively predict which instructions should be fetched and eliminate "dead" cycles that might normally be wasted. Even with these techniques, current microprocessors are limited to fetching only contiguous instructions during a single clock cycle.

As superscalar processors become more aggressive and attempt to execute many more instructions per cycle, they must also be able to fetch many more instructions per cycle. Frequent branch instructions can severely limit a processor's effective fetch bandwidth. Statistically, one of every four instructions is a branch instruction and over half of these branches are taken. A processor with a wide fetch bandwidth, say 8 contiguous instructions per cycle, could end up throwing away half of the instructions that it fetches as much as half of the time.

High performance superscalar processor organizations divide naturally into an instruction fetch mechanism and an instruction execution mechanism. The fetch and execution mechanisms are separated by instruction issue buffer(s), for example, queues, reservation stations, etc. Conceptually, the instruction fetch mechanism acts as a "producer" which fetches, decodes, and places instructions into the buffer. The instruction execution engine is the "consumer" which removes instructions from the buffer and executes them, subject to data dependence and resource constraints. Control dependences (branches and jumps) provide a feedback mechanism between the producer and consumer.

Previous designs use a conventional instruction cache, containing a static form of the program, to work with. Every cycle, instructions from noncontiguous locations must be fetched from the instruction cache and assembled into the predicted dynamic sequence. There are problems with this approach:

Pointers to all of the noncontiguous instruction blocks must be generated before fetching can begin. This implies a level of indirection, through some form of branch target table (branch target buffer, branch address cache, etc.), which translates into an additional pipeline stage before the instruction cache.

The instruction cache must support simultaneous access to multiple, noncontiguous cache lines. This forces the cache to be multiported: if multiporting is done through interleaving, bank conflicts are suffered.

After fetching the noncontiguous instructions from the cache, they must be assembled into the dynamic sequence. Instructions must be shifted and aligned to make them appear contiguous to the decoder. This most likely translates into an additional pipeline stage after the instruction cache.

A trace cache approach avoids these problems by caching dynamic sequences themselves, ready for the decoder. If the predicted dynamic sequence exists in the trace cache, it does not have to be recreated on the fly from the instruction cache's static representation. In particular, no additional stages before or after the instruction cache are needed for fetching noncontiguous instructions. The stages do exist, but not on the critical path of the fetch unit-rather, on the fill side of the trace cache. The cost of this approach is redundant instruction storage: the same instructions must reside in both the primary cache and the trace cache, and there even might be redundancy among lines in the trace cache. Accordingly, utilizing a trace cache approach several instructions are grouped together based upon a most likely path. They are then stored together in the trace cache. This system requires a complex mechanism to pack and cache instruction segments.

Accordingly, what is needed is a method and system for improving the overall throughput of a superscalar processor. More particularly, what is needed is a system and method for efficiently fetching noncontiguous instructions in such a processor. The present invention addresses such a need.

SUMMARY OF THE INVENTION

A method and system for obtaining non-contiguous blocks of instruction in a data processing system is disclosed. In a first aspect, a system for fetching noncontiguous blocks of instructions in a data processing system is disclosed. The system comprises an instruction cache means for providing a first plurality of instructions and branch logic means for receiving the first plurality of instructions and for providing branch history information about the first plurality of instructions. The system further includes an auxiliary cache means for receiving a second plurality of instructions based upon the branch history information. The auxiliary cache means overlays at least a one of the second plurality of instructions if there is a branch in the first plurality of instructions and the branch is to the second plurality of instructions.

In a second aspect, a method for obtaining noncontiguous blocks of instruction comprises storing a first plurality of instructions in a first cache and fetching the first plurality of instructions in parallel with a fetch of a second plurality of instructions within a second cache. In the present invention, the number of the second plurality of instructions being greater than the number of first plurality of instructions. This second aspect includes replacing a portion of the second plurality of instructions with at least one of the first plurality of instructions based upon a branch history information of the data processing system.

The above-described present invention allows a processor to use branch history information and an auxiliary cache to fetch multiple noncontiguous groups of instructions in a single cycle. Furthermore, the technique allows noncontiguous fetching to be performed without requiring multiple levels of nested branch prediction logic to be evaluated in a single cycle.

BRIEF DESCRIPTION OF THE DRAWINGS

FIG. 6 is a table that illustrates the flow of instructions when utilizing the branch prediction algorithm of FIG. 5.

DESCRIPTION OF THE INVENTION

The present invention relates generally to a superscalar processor and more particularly to a system and method for fetching noncontiguous instructions in such a processor. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
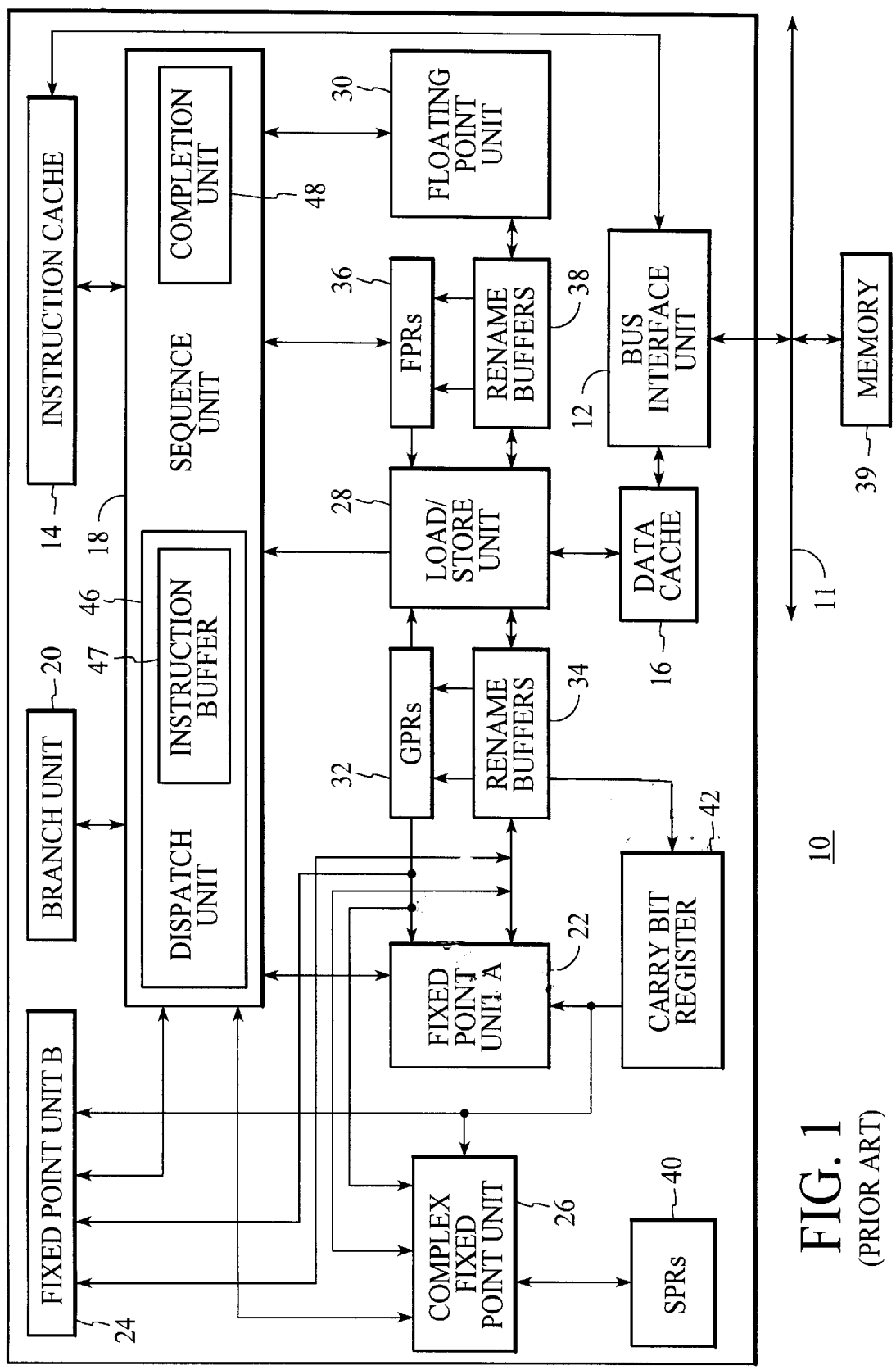
FIG. 1 is a block diagram of a superscalar processor.

FIG. 1 is a block diagram of a superscalar processor 10. As shown, the superscalar processor 10 typically include a system bus 11 connected to a bus interface unit ("BIU") 12.

BIU 12 controls the transfer of information between processor 10 and system bus 11. BIU 12 is connected to an instruction cache 14 and to a data cache 16 of processor 10. Instruction cache 14 outputs instructions to a sequencer unit 18. In response to such instructions from instruction cache 14, sequencer unit 18 selectively outputs instructions to other execution circuitry of processor 10.

In addition to sequencer unit 18 which includes execution units of a dispatch unit 46 and a completion unit 48, in the preferred embodiment the execution circuitry of processor 10 includes multiple execution units, namely a branch unit 20, a fixed point unit A ("FXUA") 22, a fixed point unit B ("FXUB") 24, a complex fixed point unit ("CFXU") 26, a load/store unit ("LSU") 28 and a floating point unit ("FPU") 30. FXUA 22, FXUB 24, CFXU 26 and LSU 28 input their source operand information from general purpose architectural registers ("GPRs") 32 and fixed point rename buffers 34. Moreover, FXUA 22 and FXUB 24 input a "carry bit" from a carry bit ("CA") register 42. FXUA 22, FXUB 24, CFXU 26 and LSU 28 output results (destination operand information) of their operations for storage at selected entries in fixed point rename buffers 34. Also, CFXU 26 inputs and outputs source operand information and destination operand information to and from special purpose registers ("SPRs") 40.

FPU 30 inputs its source operand information from floating point architectural registers ("FPRs") 36 and floating point rename buffers 38. FPU 30 outputs results (destination operand information) of its operation for storage at selected entries in floating point rename buffers 38.

Processes

The processor 10 is usually implemented with a large number of state machines that control relatively independent processes. It may be thought of as a complex parallel algorithm involving multiple concurrent processes.
Instruction Fetch This process provides a continuous stream of instructions from the instruction cache and utilizes the branch target address cache (BTAC) as a fetch prediction mechanism.
Branch Prediction This process identifies and predicts branches, verifies that the appropriate instructions were fetched, updates information, and places information about speculative branches into a Branch Queue.
Branch Resolution This process checks that the prediction matched the actual branch result and makes corrections if a misprediction occurred.
Branch Completion This process writes information for completed branches into the BHT and removes entries from the Branch Queue.

Figure 2A:
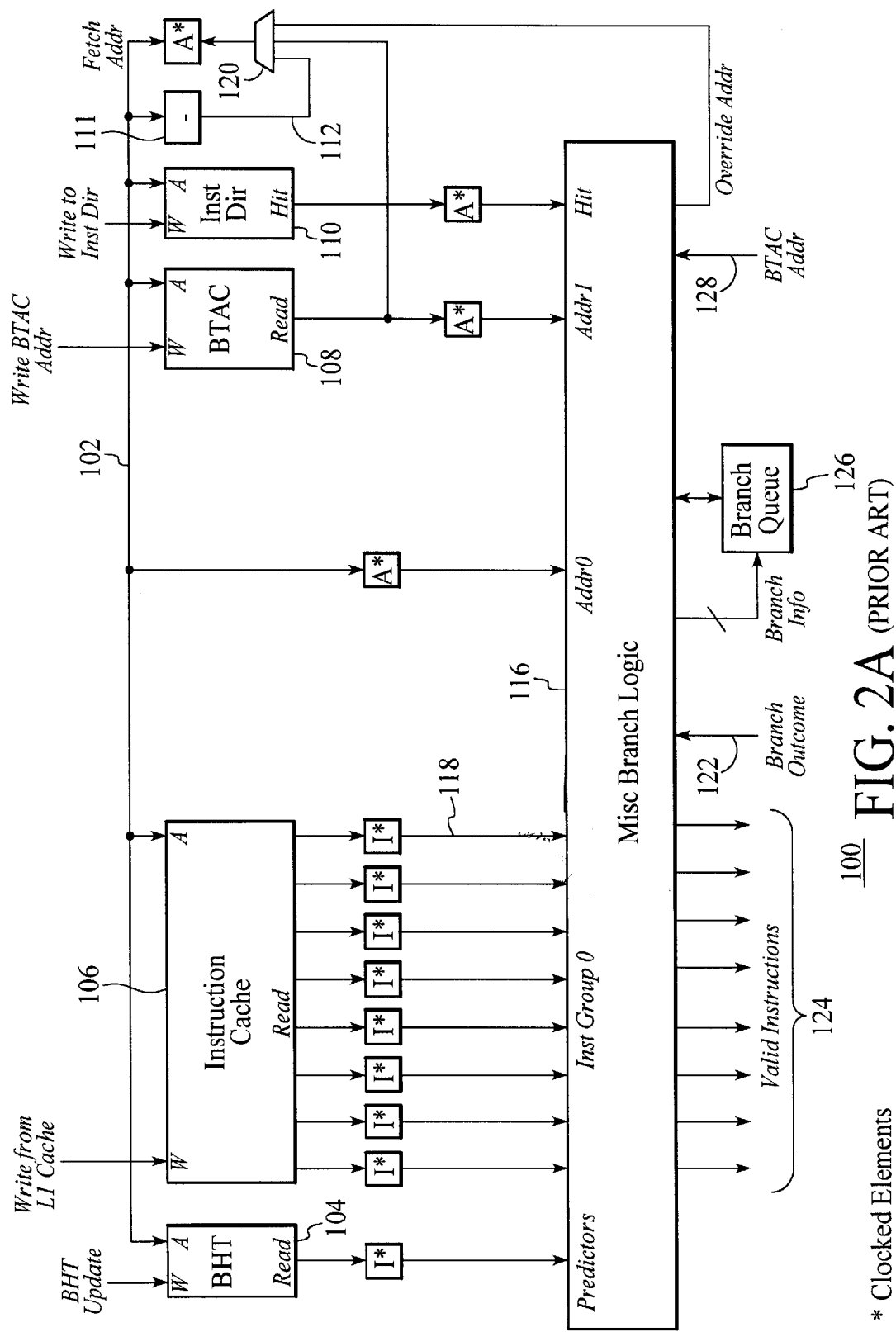
FIG. 2A is a block diagram of a conventional mechanism within a processor for fetching noncontiguous instructions.

The present invention relates generally to the fetch cycle and the ability to fetch noncontiguous instructions. FIG. 2A shows in system 100 the hardware mechanisms for the conventional technique for fetching groups of instructions. In this embodiment, eight instructions are shown being fetched at a time. In addition, the present invention is discussed with reference to instruction being four bytes length. However, one of ordinary skill in the art, readily recognizes that any number of instructions can be fetched at a time and can be of any length and that number and length would be within the spirit and scope of the present invention.

Referring back to FIG. 2A, as is seen there is a fetch address signal 102 which is provided to a branch history table (BHT) 104, an instruction cache 106, a branch target address cache (BTAC) 108, a directory for the instruction cache (INST Dir) 110, +32 counter 111. To provide a fuller understanding of the operation of the above-identified mechanism, particularly as it relates to the instruction cache 106, a conventional instruction cache entry is described below.

Figure 2B:
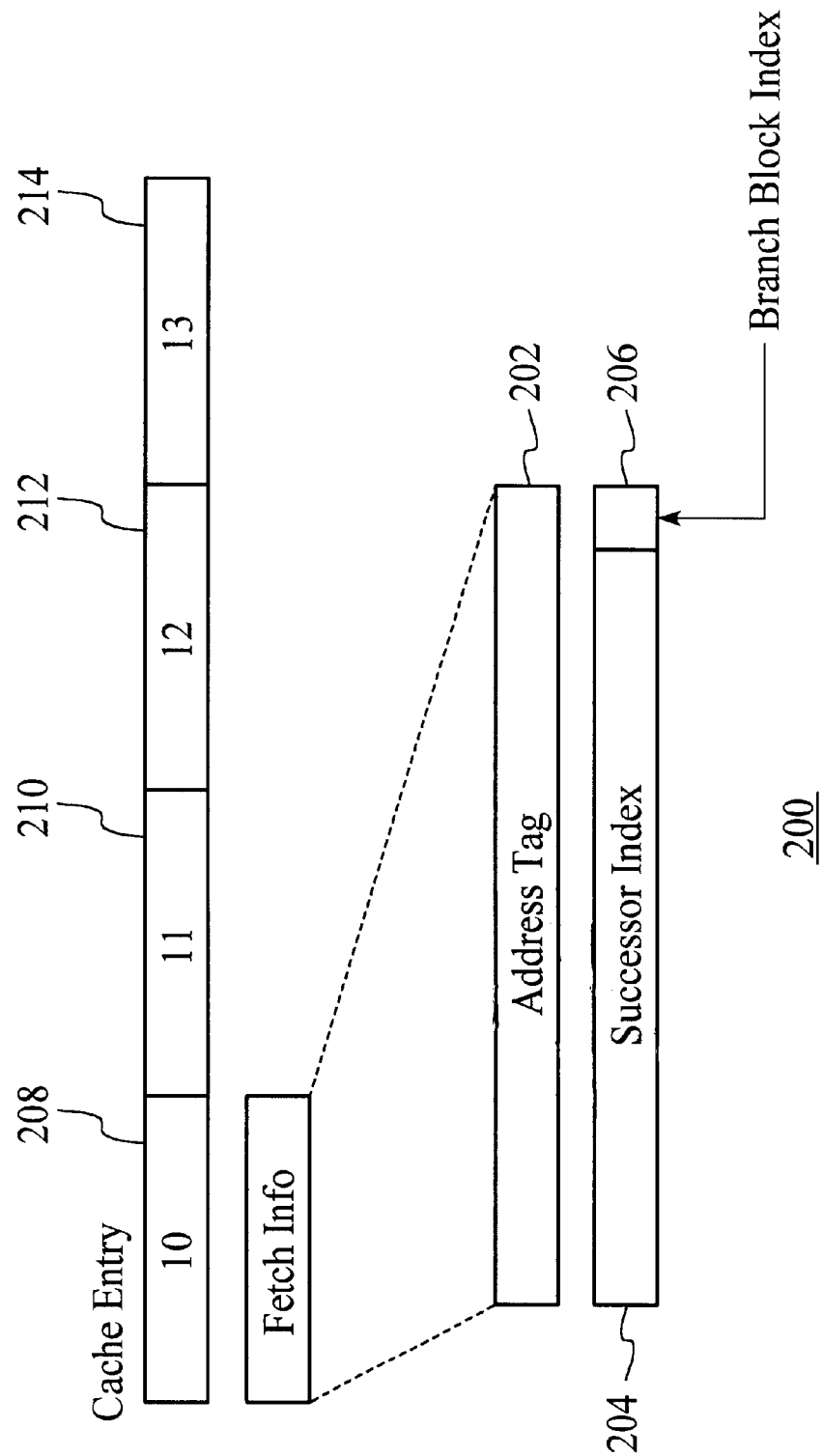
FIG. 2B is a block diagram of an instruction cache and BTAC entry.

FIG. 2B shows a simple organization for the instruction cache and BTAC entry 200 of the instruction required by an instruction fetcher (this entry may include other information that is not important for this discussion). FIG. 2B shows a fetch information 201 which includes a sample address tag 202, successor index 204, and branch block index entries 206 for a code sequence, assuming a 64-Kbyte, direct-mapped cache and the indicated instruction addresses. For this example, the cache entry holds four instructions 208, 210, 212 and 214. The entry also contains instruction-fetch information. The fetch information also includes two additional fields (not shown) used by the instruction fetcher.

The successor index field 204 indicates both the next cache block predicted to be fetched and the first instruction within this next block predicted to be executed. The successor index field 204 does not specify a full instruction address, but is of sufficient size to select any instruction within the cache. For example, a 64-Kbyte, direct-mapped cache requires a 14-bit successor index if all instructions are 32 bits in length (12 bits to address the cache block and 2 bits to address the instruction in the block if the block size is four words).

In a preferred embodiment, the branch block index field 206 indicates the location of a branch point within the corresponding instruction block. Instructions beyond the branch point are predicted not to be executed.

Referring back to FIG. 2A, the BHT 104 also receives a BHT update signal and outputs a read signal. The read signal from the BHT 104 is provided to branch logic 116. The instruction cache 106 receives write signal from an outside source, such as an L2 cache. The instruction cache 106 outputs eight instructions (instruction group 0) to the branch logic 116. An address 0 signal is provided directly to the branch logic 116. The branch logic 116 provides an override address signal to multiplexer 120. Multiplexer 120 also receives signals 32, counter 111 and the output of BTAC 108. An address 1 signal is provided from BTAC 108 to branch logic 116. The instruction directory 110 provides a hit signal to the branch logic 116. The branch logic 116 also receives the branch outcome signal, provides branch information to a branch queue 126, and outputs a BTAC address 128 and provides valid instructions 124. This type of mechanism is capable of fetching eight contiguous instructions per cycle, but would only use instructions up to the first predicted taken branch in the group. To explain this in more detail refer to the following discussion in combination with the accompanying figures.

As before described, there are several processes associated with the fetching of groups of instructions. The present invention is related to an improvement in the branch prediction algorithm and an associated modification to the conventional fetch mechanism of FIG. 2A.

Figure 3:
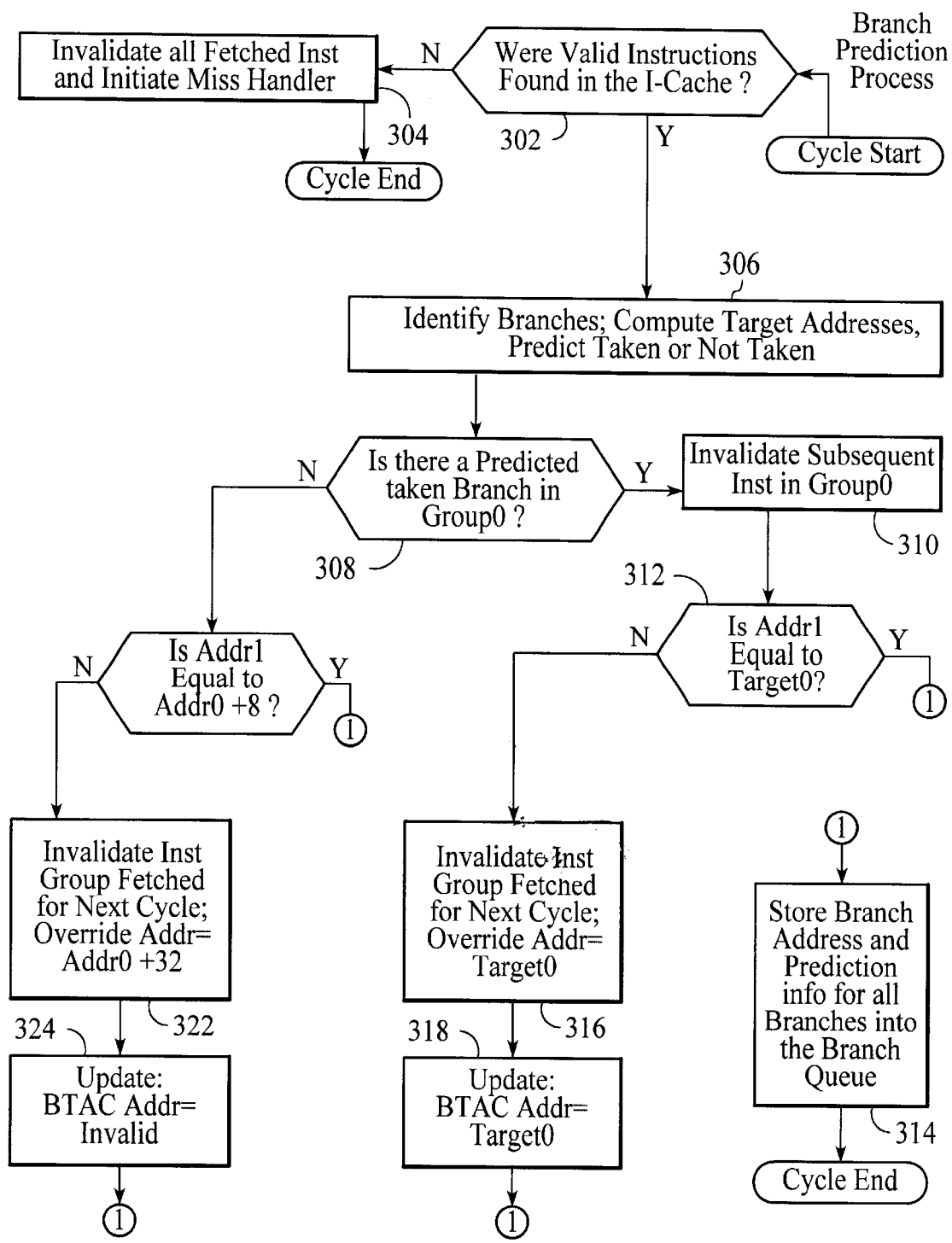
FIG. 3 is a flow chart of a branch prediction algorithm for the conventional mechanism of FIG. 2A.

To further illustrate the problems associated with the fetching of non-contiguous instructions with regard to the conventional mechanisms of FIG. 2A, refer now to FIG. 3.

FIG. 3 is a flow chart of a branch prediction algorithm for the conventional mechanism of FIG. 2A. Referring to FIGS. 2A and 3 together, first it is determined whether valid instructions are found in the instruction cache, via step 302. If there are no valid instructions found in the instruction cache, then all fetched instructions are invalidated and the miss handler is initiated, via step 304. However, if there are valid instructions found in the instruction cache, then branches are identified, target addresses are computed, and predicted taken or not taken based on the branch logic 116 and the branch history tables 104, via step 306. Thereafter it is determined whether there is a predicted taken branch in instruction group 0 (the first group of instructions), via step 308. If there is a predicted branch taken, then all subsequent instructions are invalidated, via step 310. Then it is determined if the address 1 (address of the second group of instructions) from BTAC 108 is equal to target 0 of the instruction directory, via step 312. If the answer is yes, then the branch addresses are stored and prediction information for all branches are provided into the branch queue 126, via step 314. If, on the other hand, address 1 is not equal to target 0, then the instructions that have been fetched in the next cycle are invalidated and the override address is equal to target 0, via step 316. Thereafter, the BTAC address is updated to equal target 0, via step 318, and then the branch addresses and predicted information is stored into the branch queue via step 314. If, on the other hand, at step 308 there are no predicted branches taken in group 0, then it is determined if address 1 is equal to address 0 plus 32. If the answer is yes, then return to step 314. If, on the other hand, the answer is no, then all instruction groups fetched for the next cycle are invalidated and the override address equals address 0+32, via step 322. Thereafter, the BTAC address is updated to equal invalid, via step 324 and then return to step 314.

This algorithm of FIG. 3 does not allow for fetching non-contiguous instructions in a single cycle. This prediction algorithm always requires that when a branch instruction is encountered only the instructions up to the branch can be utilized. As has been before-mentioned, there are mechanisms, i.e., trace cache, etc., to retrieve noncontiguous instructions in a single cycle but they add complexity and cost to the system.

The present invention overcomes this problem by providing an auxiliary cache and an overlaying technique that utilizes the auxiliary cache to fetch noncontiguous instructions in a single cycle.

Three major hardware mechanisms are required for this technique:

(1) a Standard Instruction Cache (or other memory source),
 (2) a Branch Target Address Cache, and
 (3) an auxiliary cache.

A Standard Instruction Cache and a Branch Target Address Cache are commonly used in most microprocessors and may be used without modification for this technique. The auxiliary cache is a new hardware mechanism that contains multiple entries with one or more instructions and an associated address. The auxiliary cache may be highly associative and relatively small compared to the main instruction cache.

The present invention operates generally in the following manner:

1. If a branch instruction in the first instruction group is considered strongly taken (based on branch history or other information) and no instructions were provided from the auxiliary cache, use the fetch index to add the branch's target address and one or more instructions at that address to the auxiliary cache. Also, an appropriate sequential address is provided as needed (e.g., branch target plus 16 bytes) to the BTAC.
 2. Else, if a branch instruction in the second instruction group is considered strongly taken, use the fetch index to add the branch's target address to the BTAC.
 3. Else, if no branch instructions in either instruction group is considered strongly taken, use the fetch index to clear the BTAC and default to an appropriate sequential address.

To more particularly describe the features and operation of the present invention, refer now to the following discussion in conjunction with the accompanying figures.

Figure 4:
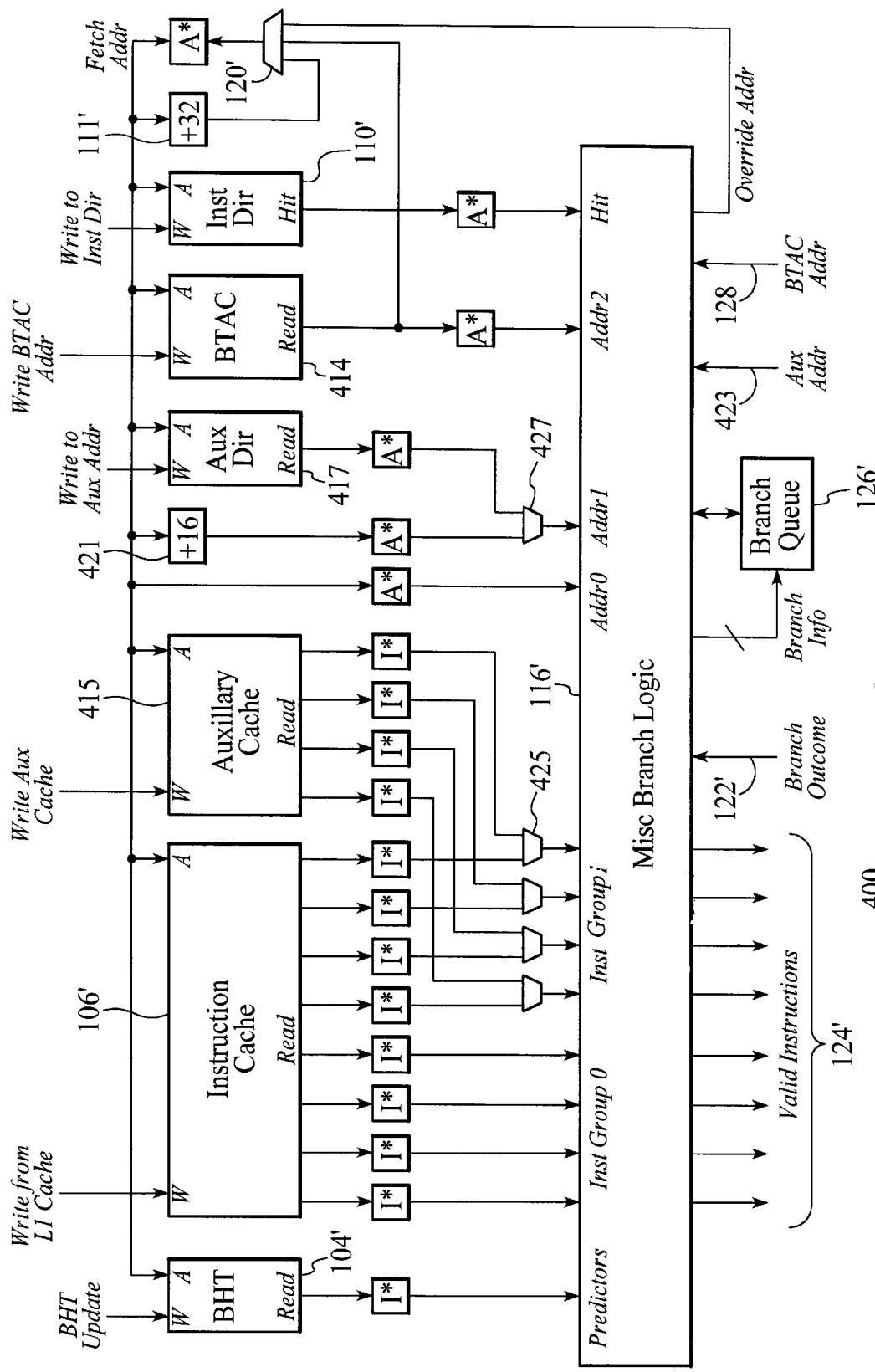
FIG. 4 is a block diagram of a mechanism within a processor for fetching noncontiguous instructions in a single cycle in accordance with the present invention.

FIG. 4 is a block diagram of a mechanism 400 within a processor for fetching noncontiguous instructions in a single cycle in accordance with the present invention. The elements of the mechanism 400 are similar to many of the elements presently in mechanism 100. Those elements that are similar have been given similar reference numerals. As has been before mentioned, the key element that is different is the addition of the auxiliary cache 415 and its directory 417.

In addition, as is seen, there are instruction groups 0 and 1 and as is seen, there are four multiplexers 425 which allow for the overlaying of the instructions from the auxiliary cache 415 in the instruction group 1 from the instruction cache 106' based on branch history information derived from BHT 104' and branch logic 116'. Similarly, the auxiliary directory also overlays its address over the address 1 signal of the +16 counter 421 based upon the branch history information. In addition, BTAC 414 also provides an address 2 signal rather than the address 1 signal provided by the BTAC 108' of FIG. 2A. Accordingly, as has been before mentioned, through the addition of the auxiliary cache 415 and the use of it and the auxiliary directory 417, it is possible now to accumulate information to allow for fetching of noncontiguous instructions. To further describe this feature in a more detailed manner, refer now to FIG. 5.

Figure 5:
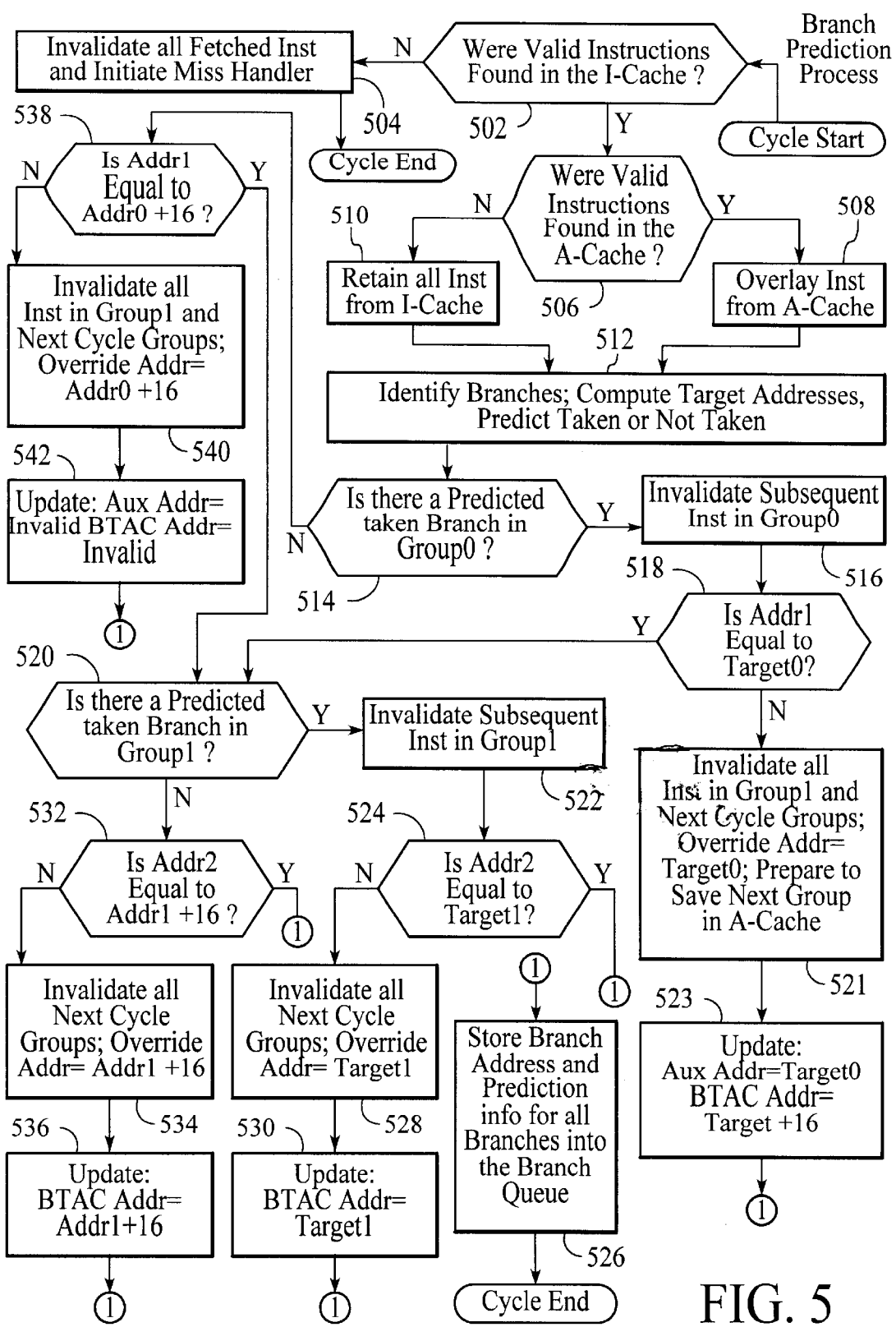
FIG. 5 is a flow chart of the branch prediction algorithm for the noncontiguous instruction fetch mechanism of FIG. 4.

FIG. 5 is a flow chart of the branch prediction algorithm for the noncontiguous instruction fetch mechanism of FIG. 4. Referring now to FIGS. 4 and 5 together, first it is determined whether there are valid instructions stored in the instruction cache 106', via step 502. If there were no valid instructions found in the instruction cache 106', then all instructions are invalidated and a miss handler is initiated, via step 504. If, on the other hand, there are valid instructions in the instruction cache 106', it is next determined whether there were valid instructions found in the auxiliary cache 415, via step 506. If there were valid instructions found in the auxiliary cache 415, then the instructions from the auxiliary cache 415 are overlaid on the instruction group from the instruction cache 106', via step 508. If, on the other hand, there were no valid instructions found in the auxiliary cache, then all the instructions from the instruction cache are retained, via step 510.

From either of the steps 508 and 510, next branches are identified, target addresses are computed, and they are predicted taken or not taken, via step 512 based upon the branch logic 106' and the BHT 104' operating in a conventional manner. Thereafter, it is then determined if there is a predicted branch taken in the instruction group 0, via step 514. If there is a predicted taken branch in instruction group 0, then the subsequent instructions are invalidated, via step 516.

Next, it is determined whether address 1 is equal to the target address 0 of the branch, via step 518. If the answer is yes, then it is determined whether there is a predicted taken branch in group 1 or in the next group of instructions, via step 520. If the answer to that question is yes, then the subsequent instructions in instruction group 1 are invalidated, via step 522. Then it is determined whether address 2 is equal to target 1 of the branch, via step 524. If the answer to that is yes, then the branch queue stores the branch addresses and prediction information for all the branches, via step 526. If the answer is no, then the next cycle group is invalidated and the override address equals target 1, via step 528. Thereafter, the BTAC address is updated to equal target 1, via 530, and return to step 526.

If address 1 is not equal to target 0 via step 518, then all the instructions in group 1 and the next cycle groups are invalidated and the override address equals target 0 and prepare to save next group in auxiliary cache, via step 521. Thereafter, the auxiliary address is updated to equal target 0 and the BTAC address equals target 0+16, via step 523.

If, on the other hand, there is no predicted branch taken in group 1, via step 520, then it is then determined if address 2 is equal to address 1 plus 16, via step 532. If the answer is yes, then return to step 526. If the answer is no, then all the next cycle groups are invalidated and the override address set to equal address 1+16, via step 534. Thereafter the FTAC address is updated to equal address 1+16, via step 536, and then return to step 526.

Returning now to step 514, if there is no predicted branches taken in group 0, then it is determined if address 1 equals address 0+16. If address 1 is equal to address 0+16, then return to step 520 and proceed through the steps based on that decision chain. If, on the other hand, the answer is no, that address 1 does not equal address 0+16, then all instructions in group 1 and the next cycle groups are invalidated and the override address equals address 0+16, via step 540. Thereafter, the auxiliary address is updated to equal invalid and the BTAC address is updated to equal invalid, via step 542. Then return to step 526. Accordingly, through this branch prediction process, the system can accumulate branch history information in a manner to allow for the overlay instruction of auxiliary cache to efficiently fetch a noncontiguous instructions. To more clearly describe the operation in the context of a particular example, refer now to FIG. 6.

FIG. 6 is an example 600 that illustrates the flow of instructions when utilizing the branch prediction algorithm of FIG. 5. The example 600 shown in FIG. 6 illustrates a sequence of fetches 602 performed on consecutive cycles in accordance with the present invention for a program segment 604. Note that all the addresses are described using a hexadecimal format (base 16). Asterisks in the example 600 indicate fetched instructions that were invalidated from the instruction stream.

As is seen, the program segment comprises a plurality of basic blocks 606, 608, 610 and 612. Each of the basic blocks 606–612 begin with a load instruction and end with a branch instruction. The basic blocks are used in conjunction with the present invention to allow for non-contiguous instructions to be obtained in a single cycle.

Through the use of the branch prediction algorithm of FIG. 5 in conjunction with the hardware mechanisms of FIG. 4, to accumulation branch history information, non-contiguous instructions of FIG. 6 can be obtained in a single cycle.

To illustrate the method for obtaining instructions in the single cycle, refer to FIGS. 4, 5 and 6. As has been indicated, at cycle 000 there are eight instructions being provided. It is assumed that the auxiliary cache 415 initially contains no instructions, and so at this time there are invalid instructions found in the information cache 502, then it is determined whether valid instructions are found in the auxiliary cache 506, and the answer would be no. In that event, then all the instructions from the instruction cache would be retained. At that point, branches are identified, target addresses are computed, and predicted taken or not taken, via step 512. It is known that the target for the branch in the first set of instructions is at 0x100. It is now determined whether there is a predicted branch taken in group 0, and the answer to that is yes. That is the third instruction in address 000. Through the branch prediction process the instruction at address 100 is provided to the auxiliary and the address is stored in the auxiliary directory. Also, through the branch prediction process address 110 would be stored in the BTAC 108 (step 530).

Then the next basic block 608 is used at cycle 003 to load the instructions at the target address 0x100. The last instructions at basic block 608 is a branch to address 200. Then address 100, as before mentioned, is then fetched and similar information is accumulated for it in the auxiliary cache, auxiliary directory and BTAC. Accordingly, information is accumulated in cycles 003–007 until, as is seen in cycle 008, two non-contiguous instructions (0X000 and 0X100) are retrieved in a single cycle.

This branch prediction process is repeated again, via basic blocks 610 and 612, wherein non-contiguous instructions are fetched in cycles 020 through 024.

Accordingly, as is seen in this example, after branch history information is accumulated in a sufficient manner, then noncontiguous instructions can be obtained in a single cycle. This process can be repeated, particularly in those instances where instructions recur, such that a majority of noncontiguous instructions can be retrieved in a single cycle. This is accomplished through the use of the auxiliary cache and the miscellaneous branch logic cooperating with the branch history tables while utilizing the branch prediction process in accordance with the present invention.

Several other techniques, such as trace caching and multi-level branch predictors; have been proposed for allowing a processor to fetch noncontiguous instructions in a single cycle. The auxiliary cache and instruction overlay technique described in accordance with the present invention is simpler than other techniques, but as effective.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for fetching noncontiguous blocks of instructions in a data processing system; the system comprising:
   an instruction cache means for providing a first plurality of instructions;
   a branch logic means for receiving the first plurality of instructions and for providing branch history information about the first plurality of instructions;
   a branch target address cache coupled to the branch logic means; and
   an auxiliary cache means comprising an auxiliary cache and an auxiliary directory, the auxiliary cache means having multiple entries including one of a plurality of instructions and an associated address; the auxiliary cache means for receiving a second plurality of instructions based upon the branch history information; the auxiliary cache means for fetching noncontiguous instructions in a single cycle, and overlaying at least one of the second plurality of instructions if there is a branch in the first plurality of instructions and the branch is to the second plurality of instructions.

2. The system of claim 1 in which the auxiliary cache means comprises an auxiliary cache and an auxiliary directory.

3. The system of claim 1 in which the first plurality of instructions comprises two blocks of instructions.

4. The system of claim 1 in which the second plurality of instructions comprises one block of instructions.

5. The system of claim 1 which further comprises a branch address target cache coupled to the branch logic.

6. A method for obtaining non-contiguous blocks of instruction in a data processing system; the method comprising the steps of:
   (a) storing a first plurality of instructions in a first cache;
   (b) utilizing an auxiliary cache means for fetching non-contiguous instructions in a single cycle, the auxiliary cache means comprising an auxiliary cache and an auxiliary directory, the auxiliary cache means having multiple entries including one of a plurality of instructions and an associated address;
   (c) fetching the first plurality of instructions in parallel with a fetch of a second plurality of instructions within a second cache, the number of the second plurality of instructions being greater than the number of the first plurality of instructions; and
   (d) replacing a portion of the second plurality of instructions with at least one of the first plurality of instructions based upon a branch history information of the data processing system.

7. The method of claim 6 wherein the first cache comprises an auxiliary cache a and the second cache comprises an instruction cache.

8. The method of claim 7 in which the auxiliary cache includes an auxiliary directory.

9. The method of claim 6 in which the second plurality of instructions comprises two blocks of instructions.

10. The method of claim 6 in which the first plurality of instructions comprises one block of instructions.

11. A system for obtaining non-contiguous blocks of instructions in a data processing system; the system comprising:
    means for storing a first plurality of instructions in a first cache;
    means for utilizing an auxiliary cache means, the auxiliary cache means for fetching noncontiguous instructions in a single cycle, the auxiliary cache means comprising an auxiliary cache and an auxiliary directory, the auxiliary cache means having multiple entries including one of a plurality of instructions and an associated address;
    means for fetching the first plurality of instructions in parallel with a fetch of a second plurality of instructions within a second cache, the number of the second plurality of instructions being greater than the number of the first plurality of instructions; and
    means for replacing a portion of the second plurality of instructions with at least one of the first plurality of instructions based upon a branch history information of the data processing system.

12. The system of claim 11 wherein the first cache comprises an auxiliary cache and the second cache comprises an instruction cache.

13. The system of claim 12 in which the auxiliary cache includes an auxiliary directory.

14. The system of claim 11 in which the second plurality of instructions comprises two blocks of instructions.

15. The system of claim 11 in which the first plurality of instructions comprises one block of instructions.

* * * * *

UNITED STATES PATENT AND TRADEMARK OFFICE
CERTIFICATE OF CORRECTION

PATENT NO. : 6,256,727 B1　　　　　　　　　　　　　　　　　　　　　　　Page 1 of 1
DATED : July 3, 2001
INVENTOR(S) : McDonald It is certified that error appears in the above-identified patent and that said Letters Patent is hereby corrected as shown below:

<u>Column 10,</u>
Line 24, claim 7 should read as follows:

7. The method of claim 6 wherein the first cache comprises an auxiliary cache and the second cache comprises an instruction cache.

Signed and Sealed this

Seventeenth Day of December, 2002

JAMES E. ROGAN
*Director of the United States Patent and Trademark Office*